(12) United States Patent
Price

(10) Patent No.: US 6,281,425 B1
(45) Date of Patent: Aug. 28, 2001

(54) APPARATUS AND METHOD OF RECHARGING A HANDHELD COMPUTING DEVICE USING SOLAR POWER

(75) Inventor: Mark D. Price, Salt Lake City, UT (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/542,226

(22) Filed: Apr. 4, 2000

(51) Int. Cl.[7] .............................. H01L 31/042; H02J 7/00
(52) U.S. Cl. ..................... 136/244; 136/245; 136/291; 320/101; 320/114
(58) Field of Search ........................... 136/244, 245, 136/291; 320/101, 114

(56) References Cited

U.S. PATENT DOCUMENTS

| | | | |
|---|---|---|---|
| 5,522,943 | * | 6/1996 | Spencer et al. ................ 136/291 |
| 5,626,686 | * | 5/1997 | Yoshida ........................ 136/244 |
| 5,656,914 | * | 8/1997 | Nagele et al. ................. 320/112 |
| 5,942,877 | * | 8/1999 | Nishimura ..................... 320/112 |
| 6,084,379 | * | 7/2000 | Buniatyan ..................... 320/101 |
| 6,131,018 | * | 10/2000 | De Crouy-Chanel et al. .... 455/90 |

\* cited by examiner

Primary Examiner—Alan Diamond
(74) Attorney, Agent, or Firm—Baniak Pine & Gannon

(57) ABSTRACT

An apparatus and method for recharging a handheld computing device using solar power is provided. A recharger housing includes a first slot for receiving a handheld computing device. A solar panel support member is slidably attached to the recharger housing. A solar panel is connected to the solar panel support member for recharging the handheld computing device when the solar panel support member is in an extended position.

21 Claims, 2 Drawing Sheets

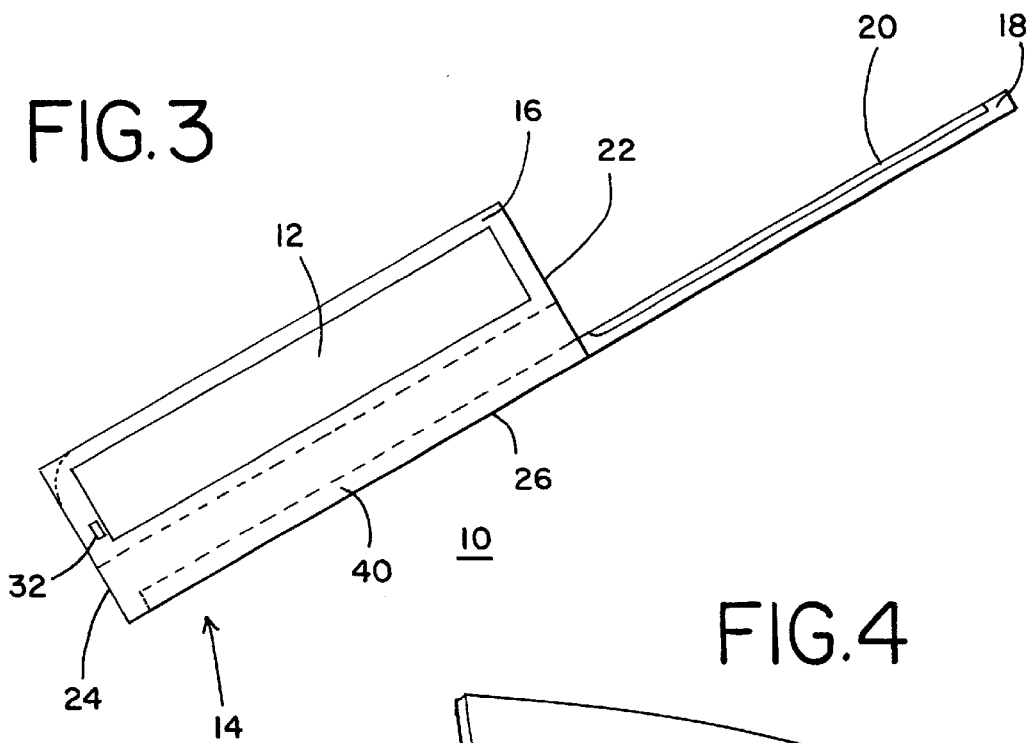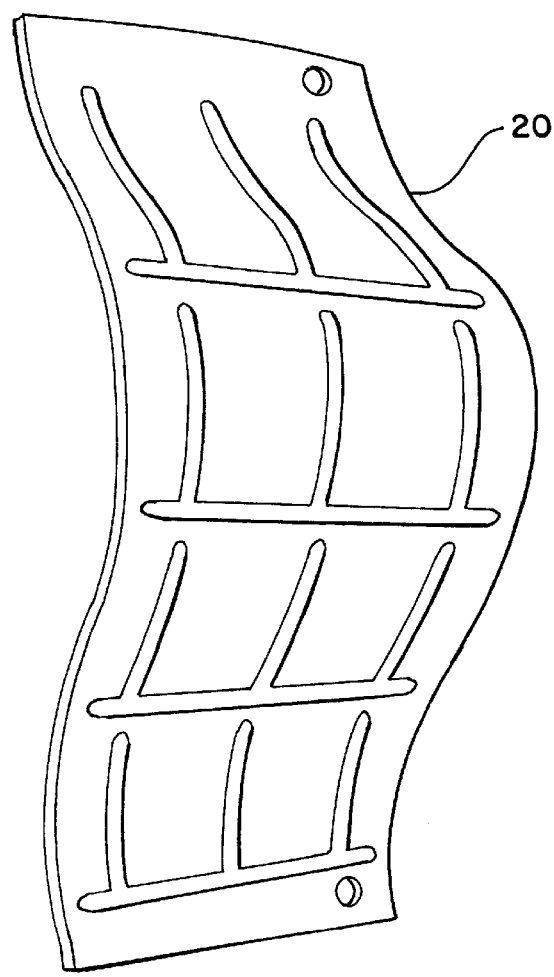

APPARATUS AND METHOD OF RECHARGING A HANDHELD COMPUTING DEVICE USING SOLAR POWER

FIELD OF THE INVENTION

This invention relates generally to the field of handheld computing devices and, in particular, to an apparatus and method of recharging a handheld computing device using solar power.

BACKGROUND OF THE INVENTION

Handheld computing devices such as, for example, the Palm Pilot manufactured and sold by 3Com Corporation, of Santa Clara, Calif., typically use standard battery chemistries including ni-cad, lithium-ion, and nickel-metal hydride. In order to recharge these batteries, operators may use standard recharging options such as, for example, conventional AC outlets. However, mobile users who are in remote locations oftentimes do not have access to conventional AC outlets. As a result, they oftentimes have no way of recharging the batteries of their handheld computing devices.

Conventional solar panel battery chargers have been used to recharge the batteries of a wide variety of electronic devices. Such solar chargers may be available from companies such as, for example, Personal Solar Inc. of Miami Beach, Fla., Powerline Solar Products Inc. of Duluth, Ga., and Sunwize Technologies Inc. of Kingstown, N.Y. However, these conventional solar panel charges typically rely on traditional solar panel designs, which are fragile, inflexible, and are relatively heavy. Conventional solar panel battery chargers are therefore typically stand-alone devices that are relatively heavy and awkward, and must be coupled to the electronic device to be recharged.

Conventional solar battery chargers typically incorporate crystalline panels, glass amorphous sheet panels, or metal-backed panels. However, there are several disadvantages to these conventional solar panels. For example, the problem with crystalline and glass amorphous sheet panels is that they are extremely fragile and can crack easily, which renders them useless for further recharging. Moreover, these conventional glass-backed panels are heavy, which render them impracticable for use with handheld computing devices.

Conventional metal-backed panels incorporate a thin sheet of metal as a backing material, which makes them less fragile than glass-backed panels. However, they are not flexible. As a result, the shape and configuration of the panels are limited to the original form of the metal backing. Moreover, the metal backing also adds a considerable amount of weight to the panel.

Accordingly, it would be desirable to have an apparatus and method of recharging a handheld computing device using solar power that overcomes the disadvantages described above.

SUMMARY OF THE INVENTION

One aspect of the invention provides an apparatus for recharging a handheld computing device using solar power. A recharger housing includes a first slot for receiving a handheld computing device. A solar panel support member is slidably attached to the recharger housing. A solar panel is connected to the solar panel support member for recharging the handheld computing device when the solar panel support member is in an extended position. The solar panel may preferably be comprised of an insulative, flexible material. The solar panel support member may preferably be positioned in a retracted position or an extended position. The recharger housing may further include a recharging interface positioned within the first slot, the recharging interface adapted to interface with the handheld computing device. The recharger housing may also include a second slot for receiving the solar panel support member and the solar panel when the solar panel support member and the solar panel are in the retracted position. A recharging indicator may also be provided, which may preferably extend through a top side of the recharger housing. The recharger housing may preferably include a top side, a bottom side, a back side, a first side, and a second side. The recharging interface may preferably be positioned within the first slot adjacent to the bottom side of the recharger housing. The solar panel support member and the solar panel may preferably be positioned adjacent to the back side of the recharger housing. The solar panel support member may preferably extend from the first side of the recharger housing to the second side of the recharger housing. The recharging housing may further include a first flange portion and a second flange portion. The first flange portion may preferably be connected to the first side of the recharger housing and may extend inward from the first side. The second flange portion may preferably be connected to the second side of the recharger housing and may extend inward from the second side. The solar panel support member may preferably be substantially parallel to the back side of the recharger housing when the solar panel support member is in the extended position.

Another aspect of the invention provides an apparatus for recharging a handheld computing device using solar power. A recharger housing includes a first slot for receiving a handheld computing device. A solar panel support member is slidably attached to the recharger housing. A flexible solar panel is connected to the solar panel support member. The solar panel support member and the flexible solar panel are in a retracted position within a second slot of the recharger housing. The solar panel support member and the flexible solar panel may preferably be substantially parallel to a back side of the recharger housing.

Another aspect of the invention provides a method of recharging a handheld computing device using solar power. A recharger housing including a first slot is provided. A solar panel support member is slidably attached to the recharger housing, and the solar panel is connected to the solar panel support member. A handheld computing device is inserted into the first slot. The solar panel support member is positioned in an extended position, and the handheld computing device is recharged. The handheld computing device may preferably be recharged during operation of the handheld computing device. The recharger housing may further include a recharging interface positioned within the first slot. The handheld computing device may preferably be in communication with the recharging interface. The recharger housing may further include a second slot, and the solar panel support member may preferably be positioned in a retracted position within the second slot. The solar panel may preferably be comprised of a flexible material.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 3 is the embodiment of FIG. 2 showing the solar panel in an extended position; and FIG. 4 is a perspective view of the solar panel shown in FIGS. 2 and 3.

DETAILED DESCRIPTION OF THE PRESENTLY PREFERRED EMBODIMENTS

Figure 1:
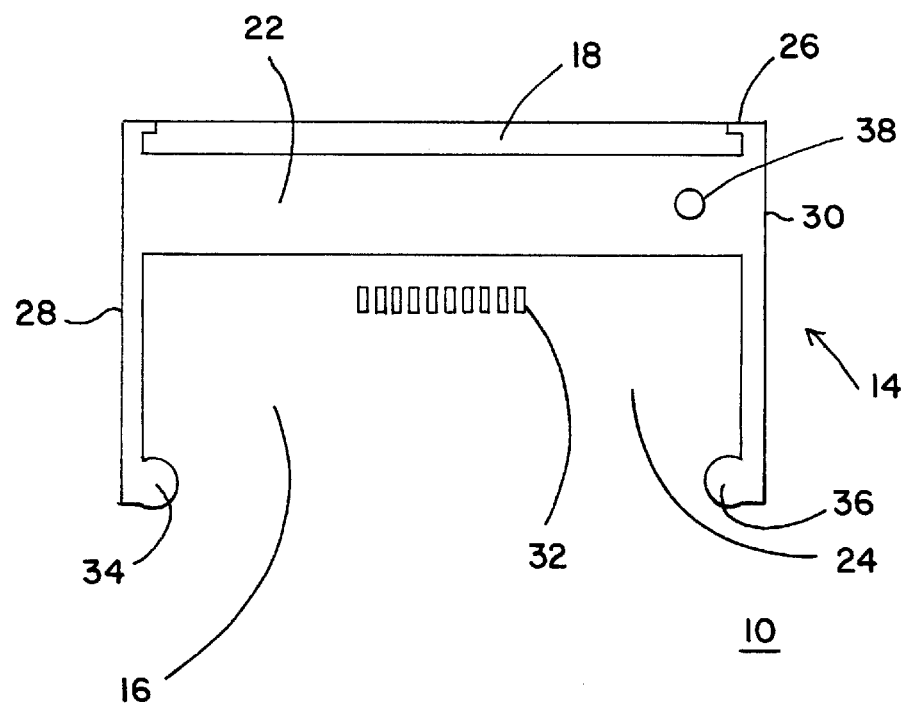
FIG. 1 is a top view of an apparatus for recharging a handheld computing device using solar power that is made in accordance with the invention.
Figure 2:
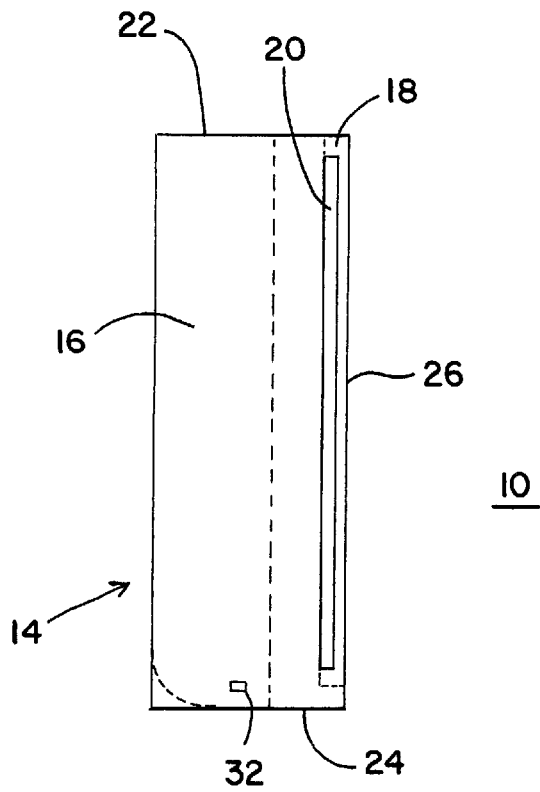
FIG. 2 is a sectional side view of the embodiment of FIG. 1 showing the solar panel in a retracted position.

Referring to FIGS. 1–3, a preferred embodiment of an apparatus 10 for recharging a handheld computing device 12 (see FIG. 3) using solar power is provided. The handheld computing device 12 may preferably be any one of the commercially available handheld computing devices such as, for example, the "Palm Pilot" manufactured and sold by 3Com Corporation, of Santa Clara, Calif.

As shown in FIGS. 1 and 3, a recharger housing 14 includes a first slot 16 for receiving the handheld computing device 12. The first slot 16 may preferably be any opening suitable for receiving the handheld computing device 12. As shown in FIGS. 1–3, a solar panel support member 18 is slidably attached to the recharger housing 14. The solar panel support member 18 may preferably be attached to the recharger housing 14 in any conventional manner to allow an operator to position the solar panel support member 18 in either a retracted position as shown in FIG. 2 or an extended position as shown in FIG. 3. The solar panel support member 18 may preferably be a planar member, although various shapes and configurations are contemplated. The solar panel support member 18 may preferably be any structure suitable for supporting a solar panel 20.

As shown in FIGS. 2–3, the solar panel 20 is connected to the solar panel support member 18. The solar panel 20 may preferably be connected to the solar panel support member 18 by any conventional fastening means such as, for example, screws, bolts, adhesives, or other fastening means. The solar panel 20 recharges the handheld computing device 12 when the solar panel support member 18 (and thus the solar panel 20) is in an extended position as shown in FIG. 3.

As shown in FIGS. 1–3, the recharger housing 14 may preferably include a top side 22, a bottom side 24, a back side 26, a first side 28 (FIG. 1), and a second side 30 (FIG. 1). It should be apparent to those of ordinary skill in the art that the shape and configuration of the recharger housing 14 may vary depending upon the particular application. The recharger housing 14 may preferably be any housing suitable for receiving the handheld computing device 12 and for receiving the slidable solar panel support member 18 and the solar panel 20.

As shown in FIGS. 1–3, the recharger housing 14 may also include a recharging interface 32 positioned within the first slot 16. In particular, the recharging interface 32 may preferably be positioned within the first slot 16 adjacent to the bottom side 24 of the recharger housing 14. The recharging interface 32 may preferably be adapted to be in communication with the handheld computing device 12 when the handheld computing device 12 is fully inserted into the first slot 16 of recharger housing 14. Charging of the batteries of the handheld computing device 12 occurs via the recharging interface 32, which matches an interface (not shown) of the handheld computing device 12.

Referring again to FIG. 1, the recharger housing 14 may further include a first flange portion 34 and a second flange portion 36. The first flange portion 34 may preferably be in communication with the first side 28 of the recharger housing 14, and may extend inward from the first side 28. The second flange portion 36 may preferably be in communication with the second side 30 of the recharger housing 14, and may extend inward from the second side 30. The first and second flange portions 34, 36 define the first slot 16, and retain the handheld computing device 12 when it is inserted into the first slot 16. A conventional recharging indicator 38 may also be provided. In the embodiment shown, the recharging indicator 38 extends through the top side 22 of the recharger housing 14. Alternatively, the recharging indicator 38 may preferably be positioned at other locations on the recharger housing 14.

As shown in FIG. 3, the recharger housing 14 may further include a second slot 40 for receiving the solar panel support member 18 and the solar panel 20 when the solar panel support member 18 and the solar panel 20 are in the retracted position (see FIG. 2). The second slot 40 may preferably be any opening suitable for receiving the solar panel support member 18 and the solar panel 20. As shown in FIG. 3, the solar panel support member 18 and the solar panel 20 may preferably be positioned adjacent to the back side 26 of the recharger housing 14. The solar panel support member 18 and the solar panel 20 may preferably be substantially parallel to the back side 26 of the recharger housing 14 when the solar panel support member 18 is in the extended position. As shown in FIG. 1, the solar panel support member 18 may preferably extend from the first side 28 of the recharger housing 14 to the second side 30 of the recharger housing 14.

The solar panel 20 may preferably be comprised of an insulative, flexible material. The solar panel 20 may preferably be the "ITF Plastic Flexible Solar Panel" manufactured and sold by Photon Technologies of Severna Park, Md. The solar panel 20 is shown generally in FIG. 4. As shown in FIG. 4, the solar panel 20 is paper-thin and flexible, which makes it lightweight and easy to implement. The solar panel 20 may preferably be made of plastic. The advantage of this arrangement is that unlike conventional crystalline or amorphous glass solar panels, the solar panel 20 is not susceptible to cracking or breaking when subjected to bending forces or small impacts. This is especially important for use with handheld computing devices, which are subjected to constant use and abuse when carried with the operator to remote locations. The dimensions of the solar panel 20 may vary depending upon the particular application and the desired output.

In operation, an operator inserts the handheld computing device 12 into the first slot 16. The handheld computing device 12 may preferably contact the recharging interface 32. The solar panel support member 18 (and hence the solar panel 20) is positioned in the extended position as shown in FIG. 3. The handheld computing device 12 is thereby recharged. One advantage of this arrangement is that the handheld computing device 12 may be recharged while the operator is using the handheld computing device 12.

When the operator is finished using the device 12, the solar panel support member 18 (and hence the solar panel 20) may preferably be stowed by positioning the solar panel support member 18 in the retracted position within the second slot 40 as shown in FIG. 2. Another advantage of this arrangement is that the lightweight and flexible solar panel 20 can be easily positioned between the extended position (FIG. 3) for recharging and the retracted position (FIG. 2) when the handheld computing device 12 is not in use.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. An apparatus for recharging a handheld computing device using solar power comprising:

a recharger housing for housing the handheld computing device including a first slot for receiving the handheld computing device, a solar panel support member slidably attached to the recharger housing and, a solar panel connected to the solar panel support member for recharging the handheld computing device when the solar panel support member is in an extended position.

2. The apparatus of claim 1 wherein the solar panel is comprised of a flexible material.

3. The apparatus of claim 2 wherein the solar panel is comprised of an insulative material.

4. The apparatus of claim 1 wherein the solar panel support member is in a retracted position.

5. The apparatus of claim 1 wherein the recharger housing further includes a recharging interface positioned within the first slot, the recharging interface adapted to interface with the handheld computing device.

6. The apparatus of claim 1 wherein the recharger housing further includes a second slot for receiving the solar panel support member and the solar panel when the solar panel support member and the solar panel are in a retracted position.

7. The apparatus of claim 1 further comprising a recharging indicator, the recharging indicator extending through a top side of the recharger housing.

8. The apparatus of claim 1 wherein the recharger housing includes a top side, a bottom side, a back side, a first side, and a second side.

9. The apparatus of claim 8 wherein a recharging interface is positioned within the first slot adjacent to the bottom side.

10. The apparatus of claim 8 wherein the solar panel support member and the solar panel are positioned adjacent to the back side of the recharger housing.

11. The apparatus of claim 8 wherein the solar panel support member extends from the first side of the recharger housing to the second side of the recharger housing.

12. The apparatus of claim 8 wherein the recharger housing further includes a first flange portion and a second flange portion, the first flange portion connected to the first side and extending inward from the first side, the second flange portion connected to the second side and extending inward from the second side.

13. The apparatus of claim 8 wherein the solar panel support member is substantially parallel to the back side of the recharger housing when the solar panel support member is in the extended position.

14. An apparatus for recharging a handheld computing device using solar power comprising:

a recharger housing for housing the handheld computing device including a first slot for receiving the handheld computer device, a solar panel support member slidably attached to the recharger housing and, a flexible solar panel connected to the solar support member, the solar panel support member and the flexible solar panel in a retracted position within a second slot of the recharger housing.

15. The apparatus of claim 14 wherein the solar panel support member and the flexible solar panel are substantially parallel to a back side of the recharger housing.

16. A method of recharging a handheld computing device using solar power comprising the steps of:

providing a recharger housing for housing the handheld computing device including a first slot, a solar panel support member slidably attached to the recharger housing, and a solar panel connected to the solar panel support member;

inserting the handheld computing device into the first slot;

positioning the solar panel support member in an extended position; and recharging the handheld computing device.

17. The method of claim 16 wherein the recharger housing further includes a recharging interface positioned within the first slot and further comprising the steps of:

interfacing the handheld computing device with the recharging interface.

18. The method of claim 16 wherein the recharger housing further includes a second slot and further comprising the steps of:

positioning the solar panel support member in a retracted position within the second slot.

19. The method of claim 16 wherein the solar panel is comprised of a flexible material.

20. The method of claim 16 wherein the handheld computing device is recharging during operation of the handheld computing device.

21. An apparatus for recharging a handheld computing device using solar power comprising:

a recharger housing including a first slot for receiving a handheld computing device, a top side, a bottom side, a back side, a first side, and a second side, the recharger housing further including a first flange portion and a second flange portion, the first flange portion connected to the first side and extending inward from the first side, the second flange portion connected to the second side and extending inward from the second side, a solar panel support member slidably attached to the recharger housing and, a solar panel connected to the solar panel support member for recharging the handheld computing device when the solar panel support member is in an extended position.

* * * * *